US011242876B2

(12) United States Patent
Cadalen et al.

(10) Patent No.: US 11,242,876 B2
(45) Date of Patent: Feb. 8, 2022

(54) DRIVING DEVICE

(71) Applicant: THALES, Courbevoie (FR)

(72) Inventors: François Cadalen, Sophia Antipolis (FR); Yohann Fraisse, Sophia Antipolis (FR); François Warnan, Sophia Antipolis (FR)

(73) Assignee: THALES, Courbevoie (FR)

( * ) Notice: Subject to any disclaimer, the term of this patent is extended or adjusted under 35 U.S.C. 154(b) by 442 days.

(21) Appl. No.: 16/473,606

(22) PCT Filed: Dec. 27, 2017

(86) PCT No.: PCT/EP2017/084610
§ 371 (c)(1),
(2) Date: Jun. 25, 2019

(87) PCT Pub. No.: WO2018/122239
PCT Pub. Date: Jul. 5, 2018

(65) Prior Publication Data
US 2021/0131461 A1   May 6, 2021

(30) Foreign Application Priority Data
Dec. 27, 2016  (FR) ...................................... 1601874

(51) Int. Cl.
*F16B 2/06*  (2006.01)
*F16B 2/08*  (2006.01)
(Continued)

(52) U.S. Cl.
CPC ................ *F16B 2/065* (2013.01); *F16B 2/08* (2013.01); *F16H 25/2015* (2013.01); *B64D 7/00* (2013.01); *F16H 2025/2059* (2013.01)

(58) Field of Classification Search
CPC ........ F16B 2/065; F16B 2/08; F16H 25/2015; F16H 2025/2059
See application file for complete search history.

(56) References Cited

U.S. PATENT DOCUMENTS 2,818,744 A * 1/1958 Moody .................. B64C 13/34
74/89.37
4,241,813 A * 12/1980 Van De Sompele ... F16D 49/10
188/106 F
(Continued)

FOREIGN PATENT DOCUMENTS

CN   1 181 473 A    5/1998
EP   0 739 724 A2   10/1996
(Continued)

*Primary Examiner* — William Kelleher
*Assistant Examiner* — Gregory T Prather
(74) *Attorney, Agent, or Firm* — BakerHostetler

(57) ABSTRACT

A drive device includes a screw-and-nut system comprising a threaded rod and a first nut that is connected to the threaded rod by means of a screw connection; a gearset, allowing a rotational movement to be transmitted to the threaded rod, a first toothed wheel and a second toothed wheel engaged with the first toothed wheel; a set of stops comprising a first stop connected to the first wheel rotating about an axis of rotation of the first wheel and a second stop connected to the second toothed wheel rotating about an axis of rotation of the second wheel, the first stop and the second stop being configured and arranged to butt against one another so as to limit an angular travel of the threaded rod at a first angular position in a first direction.

16 Claims, 6 Drawing Sheets

(51) Int. Cl.
*F16H 25/20* (2006.01)
*B64D 7/00* (2006.01)

(56) References Cited

U.S. PATENT DOCUMENTS

| | | | | |
|---|---|---|---|---|
| 4,633,698 | A | * | 1/1987 | Oetiker .................... F16B 2/08 |
| | | | | 72/168 |
| 4,811,581 | A | * | 3/1989 | Oetiker ................. B21D 53/36 |
| | | | | 72/11.5 |
| 4,844,397 | A | * | 7/1989 | Skakoon ............. A61M 5/1413 |
| | | | | 248/231.71 |
| 2010/0038983 | A1 | | 2/2010 | Bhugra et al. |
| 2012/0227524 | A1 | | 9/2012 | Takahashi et al. |
| 2019/0170273 | A1 | * | 6/2019 | May ........................ F16L 3/137 |
| 2019/0338840 | A1 | * | 11/2019 | Cadalen .................. G01B 5/14 |
| 2021/0131461 | A1 | * | 5/2021 | Cadalen .................. F16B 2/065 |
| 2021/0131463 | A1 | * | 5/2021 | Cadalen .................. H01Q 1/30 |

FOREIGN PATENT DOCUMENTS

| | | |
|---|---|---|
| EP | 1 195 541 A1 | 4/2002 |
| FR | 318 545 A | 10/1902 |
| WO | 2011/096913 A1 | 8/2011 |

\* cited by examiner

DRIVING DEVICE

CROSS-REFERENCE TO RELATED APPLICATIONS

This application is a National Stage of International patent application PCT/EP2017/084610, filed on Dec. 27, 2017, which claims priority to foreign French patent application No. FR 1601874, filed on Dec. 27, 2016, the disclosures of which are incorporated by reference in their entirety.

FIELD OF THE INVENTION

The present invention relates to screw-and-nut system drive devices. in mechanisms of this type, the rotation of a threaded rod results in the translational movement of a nut, connected to the threaded rod by a screw connection, along the longitudinal axis of the rod.

BACKGROUND

Such mechanisms are implemented in particular in detection devices for helicopter anti-submarine warfare, in which an antenna for detecting submarine threats is suspended from an aerial platform such as an aircraft which makes it possible to dip the antenna. The antenna comprises the emitters and receivers per se, and potentially electronic equipment associated with the emitters and receivers. It may also comprise environmental sensors. Moreover, on board the aerial platform, the detection device comprises equipment required for generating the acoustic signals and processing the received acoustic data.

An example of a detection device is shown in FIG. 1. It comprises a winch 100 designed to be installed in an aerial platform. The airborne warfare device comprises an antenna 101 suspended at the end of an electric/hoisting cable 102 of the winch 100, possibly provided with a funnel 103 as is the case in FIG. 1. The winch 100 is designed to deploy and recover the antenna 101. In FIG. 1, the winch 100 is secured to a floor 200 of an aerial platform. The electric/hoisting cable 102 serves to carry signals and the electrical energy required for the acoustic emission and/or the operation of the receivers. Unwinding the cable 102 using the winch 100 lowers the antenna 101 through the funnel 103 (if present) and into the water. Winding the cable 102 serves to raise the antenna 101 into the aerial platform within the funnel 103 (if present) as shown in FIG. 1.

The antenna 101 takes the shape of an essentially cylindrical elongate dome. It comprises an elongate body 112 along the axis z having an outer circumference of essentially circular cross section in a plane perpendicular to the longitudinal axis z of the antenna 101. The elongate body 112 is surrounded by a protective structure (or "bumper") 113 having an outer circumference of essentially circular cross section in a plane perpendicular to the longitudinal axis z of the antenna 101. The outer circumference of the protective structure 113 and the outer circumference of the elongate body 112 are essentially concentric. When the antenna 101 is suspended by its own weight by the cable 102, the latter also extends along the longitudinal axis of the antenna.

Keeping the antenna 101 in place in the aerial platform solely by means of the cable 102 does not make it possible to obtain an adequate level of safety when the aerial platform is in transit, in particular over populated areas. The cable 102 may break, it may be cut accidentally by the pyrotechnic safety cutter, the brake on the winch 100 may fail and accidentally release the cable. The loss of the antenna 101 represents a considerable financial loss but above all its large mass could fall into the sea or to the ground causing serious material or human damage.

The position of the antenna 101 with respect to the winch 100 must be locked when it is in place on board the aerial platform. The detection device then advantageously comprises a banding device 104. This banding device 104 serves to lock the position of the antenna 101 with respect to the winch 100 so as to prevent an accidental fall of the antenna and the associated consequences.

The known banding devices comprise a clamping strip forming a loop that straps or binds the antenna 101 and a drive device with a screw-and-nut system motion, allowing the size of the loop to be decreased in what is referred to as a clamping step or the size of the loop to be increased in what is referred to as an unclamping step, in order to grip the antenna 101 or in order to unclamp it so as to release it, respectively. Each end of the clamping strip is engaged with a screw thread of the threaded rod in translation along the threaded rod. The nuts are engaged with screw threads which are formed in opposite directions so that clamping and unclamping are achieved by moving the ends of the clamping strip in opposite directions along the longitudinal axis of a threaded rod. The rotation of the threaded rod may be driven by a motor that is coupled to the threaded rod or by an operator via a grip that is rigidly connected to the threaded rod.

The size of the loop should be prevented from exceeding a maximum size or from going below a certain minimum size.

To block the travel of the nuts, the applicant has envisaged, in the context of the present invention, the installation of stops, each stop being installed in the path of one of the nuts along the axis of the threaded rod in one (clamping or unclamping) direction. The nut, which is translationally movable with respect to a stop along the axis of the threaded rod, approaches the stop in the unclamping operation so as to butt against it, which will block the translational movement of the nut with respect to the stop and thus prevent the size of the loop formed by the clamping strip from increasing or decreasing.

However, a solution of this type may result in the strap becoming stuck. Specifically, when the nut butts against the stop, a gripping action takes place in the screw thread between the threaded rod and the nut. A large torque is then required to loosen the grip between the nut and the threaded rod in order to release the contact between the nut and its stop. This torque may then prove to be excessive if the if the grip between the nut and the stop is too tight. For example, an operator may be capable of rotating the threaded rod until a nut butts, in one direction, against a stop, but the torque that has to be applied to the threaded rod in order to reverse it may prove to be too large for the motor or another operator. Moreover, sticking may still occur between the screw and the nut, which is likely to increase the torque required for loosening the grip still further.

SUMMARY OF THE INVENTION

An object of the invention is to provide a drive device comprising a screw-and-nut system making it possible to block the travel of the nut with respect to the threaded rod in one direction without resulting in a situation of the nut becoming stuck with respect to the threaded rod.

To this end, one subject of the invention is a drive device comprising:
- a screw-and-nut system comprising a threaded rod and a first nut that is connected to the threaded rod by means of a screw connection;
- a gearset, allowing a rotational movement to be transmitted to the threaded rod, a first toothed wheel and a second toothed wheel engaged with the first toothed wheel,
- a set of stops comprising a first stop connected to the first wheel rotating about an axis of rotation of the first wheel and a second stop connected to the second toothed wheel rotating about an axis of rotation of the second wheel, the first stop and the second stop being configured and arranged to butt against one another so as to limit an angular travel of the threaded rod at a first angular position in a first direction.

In one embodiment, the first stop and the second stop are configured and arranged to butt against one another so as to limit the angular travel of the threaded rod at a second angular position in a second direction, opposite the first direction.

In another embodiment, the set of stops comprises a third stop connected to the first wheel rotating about the axis of rotation of the first wheel or connected to the second toothed wheel rotating about the axis of rotation of the second wheel and configured and arranged to butt against the second stop, or respectively against the first stop, so as to limit the angular travel of the threaded rod at a second angular position in a second direction, opposite the first direction.

In another embodiment, the set of stops comprises a first additional stop connected to the second toothed wheel rotating about the axis of rotation of the second wheel and a second additional stop connected to the first wheel rotating about the axis of rotation of the first wheel, the first additional stop and the second additional stop being configured and arranged to butt against one another so as to limit an angular travel of the threaded rod at a second angular position in the second direction, opposite the first direction.

The device advantageously comprises at least one of the features below, taken alone or in combination:
- the first toothed wheel has a first number of teeth and the second toothed wheel has a second number of teeth, different from the first number of teeth;
- the first number of teeth and the second number of teeth together make a prime number;
- at least one stop of the set of stops is able to occupy a plurality of predetermined set angular positions, with respect to the wheel to which it is rotationally connected, about the axis of rotation of the wheel;
- at least one stop is mounted removably on the first wheel or on the second wheel at one angular position taken from a plurality of angular positions;
- it comprises a motor that is coupled to the threaded rod and drives the threaded rod so that it rotates on the longitudinal axis;
- the threaded rod is coupled to the motor via a torque limiter;
- the rod is coupled to the motor via a torque limiter and a freewheel which are configured to limit a turning torque of the threaded rod on its longitudinal axis to one direction of rotation only;
- it comprises a control member and at least one sensor for detecting a first operational maximum angular position of the threaded rod in the first direction preceding the first angular position in the first direction, the control member receiving measurements from the first position sensor and being configured to control the motor on the basis of the measurements from the sensor so as to stop the motor when the first limit angular position is reached;
- it comprises a grip that is rigidly connected to one toothed wheel of the gearset allowing an operator to turn said toothed wheel on an axis of rotation of said toothed wheel.

The invention also relates to a strapping device for binding an object comprising a clamping strip comprising a first end and a second end and forming a loop that is intended to surround the object, the strapping device comprising a drive device as claimed in any one of the preceding claims, the drive device allowing the two ends to move with respect to one another so as to increase or decrease the size of the loop, the first end of the clamping strip being rigidly connected to the first nut in translation along the axis of the threaded rod.

Advantageously, the first nut is engaged with a first screw thread of the threaded rod, the screw-and-nut system comprising a second nut engaged with a second screw thread of the threaded rod which is formed in the opposite direction to the first thread, the second end of the clamping strip being rigidly connected to the second nut in translation along the axis of the threaded rod.

The invention also relates to a holding device for gripping a hollow object, said device comprising a first pad and a second pad which are capable of pressing against a hollow object, on the interior of the object, the holding device comprising a drive device according to the invention, configured to move the two pads in relation to one another so as to move them away from one another in order to grip the object or to move them closer together in order to release the object, the first pad being rigidly connected to the first nut in translation along the axis of the threaded rod, the screw-and-nut system comprising a second nut engaged with a second screw thread which is formed in the opposite direction to the first thread, the second pad being rigidly connected to the second nut in translation along the axis of the threaded rod.

BRIEF DESCRIPTION OF THE DRAWINGS

The invention will be better understood on studying a few embodiments described by way of completely non-limiting example and illustrated by appended drawings, in which.

From one figure to another, the same elements are denoted using the same reference numbers.

DETAILED DESCRIPTION

Figure 1:
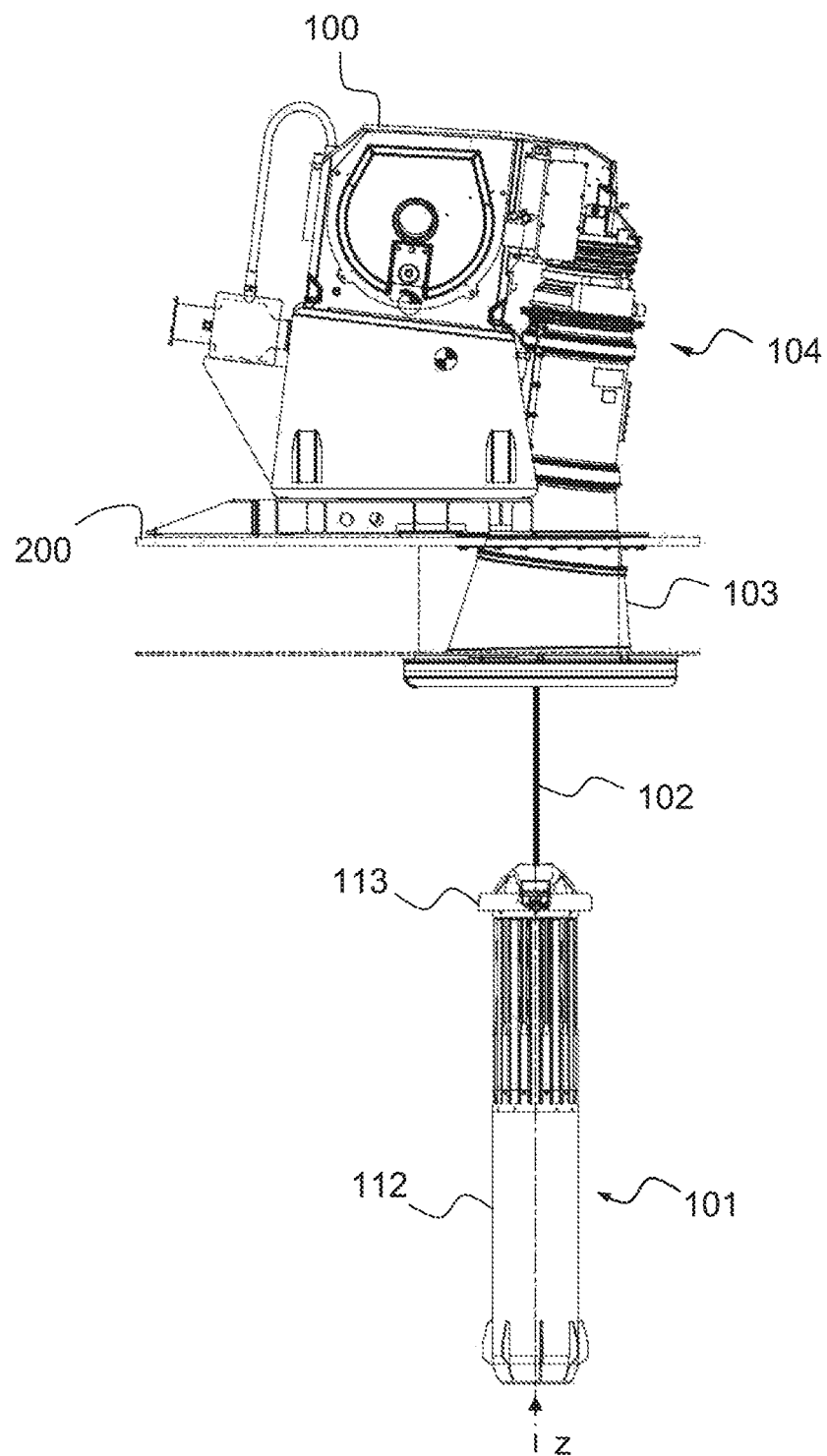
FIG. 1, which has already been described, schematically shows a detection device.

The invention relates to a screw-and-nut system drive device that can be used in a strapping device 4 intended to be incorporated into an airborne warfare device or detection device as shown in FIG. 1. The invention also relates to the strapping device 4 and the detection device as shown in FIG. 1, comprising the strapping device 4 according to the invention. The strapping device 4 may more generally be used to grip any type of object, preferably one with a circular cross section but this may be otherwise.

The drive device makes it possible to drive at least one nut in translation with respect to the threaded rod along the longitudinal axis of the threaded rod.

The drive device may be used for devices other than strapping devices which require, for example, a rotational movement to be transformed into a translational movement. By way of example, the drive device may be implemented in a machine tool in which a plate is being translationally moved. Use of the invention is of benefit in limiting the movement of the plate.

Figure 2:
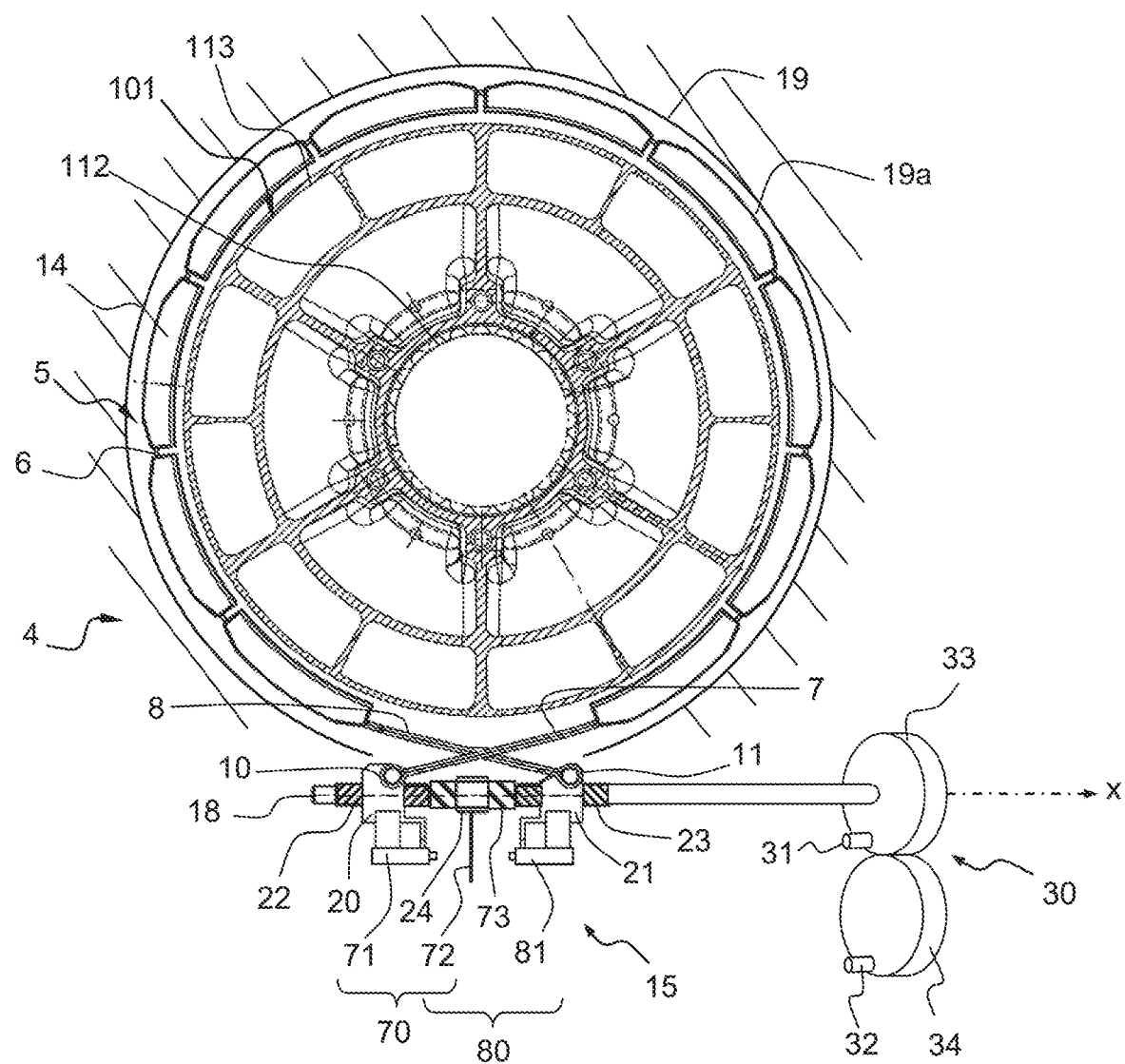
FIG. 2 schematically shows a strapping device according to the invention comprising a drive device according to the invention.

As shown in FIG. 2, the strapping device 4 comprises a strap 5 that is suitable for binding an object, for example an antenna 101, and more specifically its protective structure 113. The strapping device makes it possible to grip or release the object, here the antenna 101. The strap 5 comprises a clamping strip 6 forming a loop for binding the object. The clamping strip 6 comprises two longitudinal ends 10 and 11.

The strapping device 4 also comprises a clamping/unclamping device 15 serving to move the longitudinal ends 10 and 11 of the clamping strip 6 with respect to one another so as to decrease the size of the loop in order to be able to clamp an object, for example the antenna 101, in what is referred to as a clamping step, or to increase the size of the loop in order to be able to unclamp or release an object initially clamped by the band 5, in what is referred to as an unclamping step. To vary the size of the loop is to vary the length of the perimeter of the loop, that is to say the diameter of the loop. Shortening the perimeter of the loop, which occurs during clamping, exerts a pressure on the object 101 that is to be clamped, and forms an assembly through clamping between the strap 5 and the object 101. In order to keep the object 101 clamped, the clamping/unclamping device 15 maintains tensile forces on the free ends of the strap 5. A frame 19 delimits a housing 19a accommodating the strap 5. The housing has a circular cross section in a plane perpendicular to the axis z (plane of FIG. 2).

The clamping/unclamping device 15 is a drive device according to the invention.

The clamping/unclamping device 15 comprises a screw-and-nut system 17 comprising a threaded rod 18 and at least one nut 20. The threaded rod 18 is connected to a frame 19 by a pivot connection 218, visible in FIG. 6 which will be described below, allowing the threaded rod to rotate with respect to the frame 19 on the longitudinal axis x of the threaded rod 18.

The screw-and-nut system 17 comprises a first nut 20 connected by screw connection to the threaded rod 18 and connected to the frame 19 by a connection that prevents the nut from rotating on the axis x. Thus, the nut 20 moves in translation with respect to the frame 19 along the axis x. The screw-and-nut system 17 also comprises a second nut 21 connected by screw connection to the threaded rod 18 and connected to the frame 19 by a connection that prevents the nut from rotating on the axis x. Thus, the nut 21 moves in translation with respect to the frame 19 along the axis x. As shown in FIG. 2, the first nut 20 is engaged with a first screw thread 22 of the threaded rod 18 and the second nut 21 is engaged with a second screw thread 23 of the threaded rod 18. The first screw thread 22 and the second screw thread 23 are formed in opposite directions and may have the same pitch. Different pitches are also possible. The first end 10 of the clamping strip 6 is rigidly connected to the nut 20 in terms of translational movement along the axis x and the end 11 is rigidly connected to the nut 21 in terms of translational movement along the axis x. As a result, the screw-and-nut system makes it possible to move the two ends of the clamping strip 10 and 11 in opposite directions and at the same speed, if the pitches are identical, with respect to the threaded rod 18 and to the frame 19, parallel to the axis of the threaded rod 18, during the clamping (when the rod turns in one direction on the axis x) and unclamping (when the rod turns in the opposite direction) operations.

The end 10 or 11 may be rigidly connected to the nut 20 or 21 (attached to the nut or formed as one piece with the nut) or connected by pivot connection to the nut 20 or 21 on an axis that is substantially perpendicular to the axis x and substantially perpendicular to the plane of the clamping strip 6 (plane of the loop).

In the embodiment of the figures, the screw-and-nut system 17 comprises two nuts 20 and 21 each connected to a respective end 10 and 11. As a variant, the screw-and-nut system comprises a single nut connected by screw connection to the threaded rod 18 and rigidly connected to one of the ends 10 or 11 in terms of translation with respect to the frame along the axis x. The other end is, for example, fixed to the frame 19.

The drive device 15 comprises a gearset 30 allowing a rotational movement to be transmitted to the threaded rod 18. The gearset 30 comprises a first toothed wheel 33 and a second toothed wheel 34 engaged with the first toothed wheel 33. These toothed wheels are contiguous. The wheel 33 is coupled to the threaded rod 18 so as to allow a rotational movement of the wheel 34 on an axis of rotation p of the wheel 34 to be transmitted, via the toothed wheel 33, to the threaded rod 18. The wheel 33 is the driven wheel and the wheel 34 is the drive wheel. The threaded rod 18 then turns on its longitudinal axis x. The two toothed wheels 33 and 34 turn in opposite directions on their respective axes of rotation.

In the embodiment of FIG. 2, the gearset 30 comprises only two toothed wheels 33 and 34 and their axes of rotation are parallel to the axis of rotation x of the threaded rod 18. As a variant, the gearset 30 comprises more than two toothed wheels and the axes of rotation of the wheels are not necessarily parallel to the longitudinal axis of the threaded rod 18.

According to the invention, the drive device 15 comprises a travel limiter for limiting the angular travel of the threaded rod 18 on the axis x. Consequently, the travel limiter makes it possible to limit the travel of the nuts along the axis x. The travel limiter comprises a set of stops comprising a first stop 31 and a second stop 32 which are arranged to butt against one another so as to limit the angular travel of the threaded rod 18 in a first direction of rotation on the axis x.

Figure 3A:
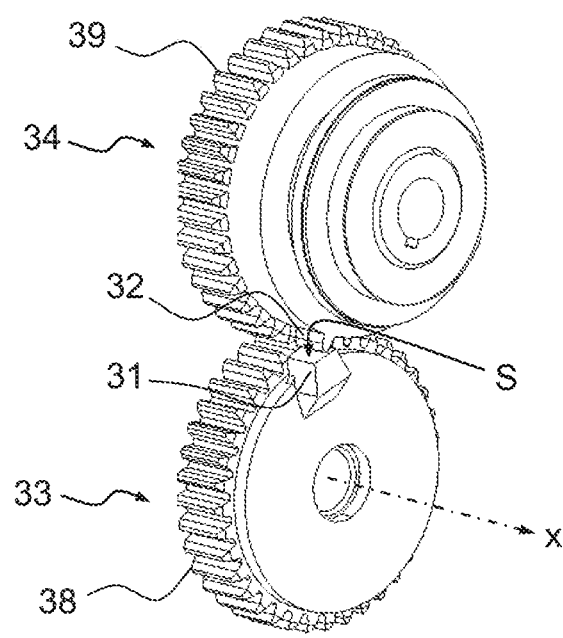
FIGS. 3a to 3c show a gearset of a drive device according to a first embodiment in a configuration in which a first direction is blocked (FIG. 3a showing a perspective view and 3b showing a front view) and in a configuration in which a second, opposite direction is blocked (FIG. 3c showing a front view)
Figures 3B, 3C:
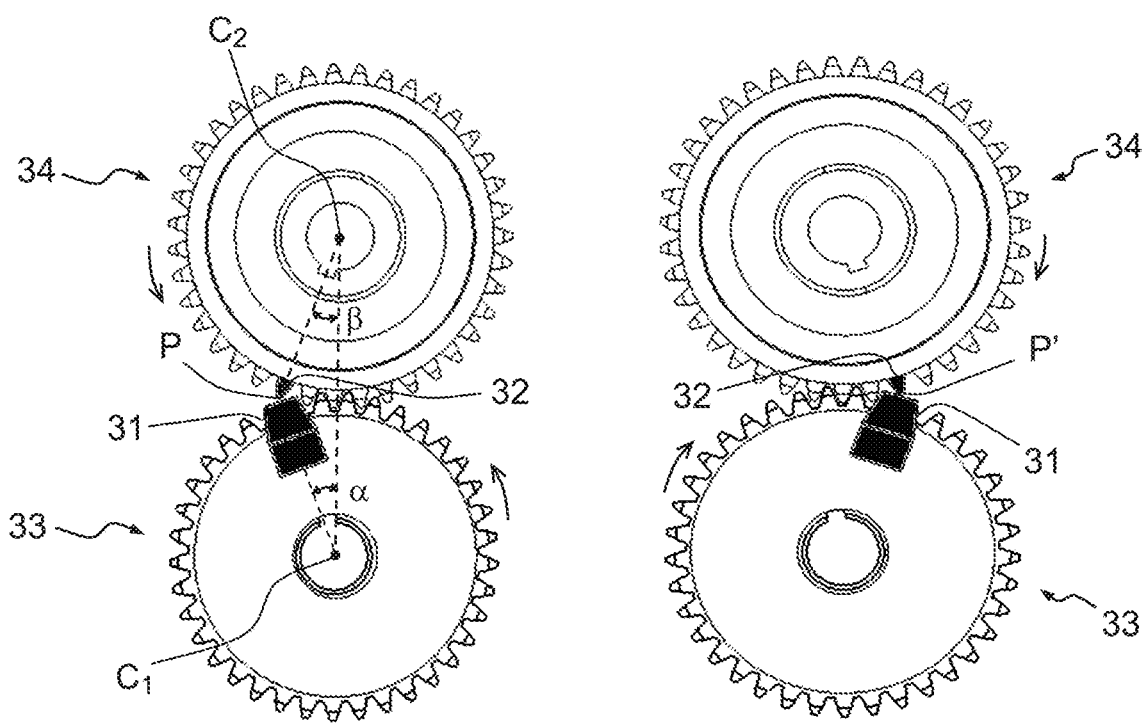

The stop 31 is connected to the first toothed wheel 33 in rotation about the axis of rotation of the wheel 33. In other words, the stop 31 is rotated, by the wheel 33, about the axis of rotation of the wheel 33. The second stop 32 is connected to the second toothed wheel 34 in rotation about the axis of rotation of the wheel 34. Since the two wheels 33, 34 turn in opposite directions, the positions of the stops 31 and 32 with respect to one another vary with the rotation of the threaded rod 18 on its longitudinal axis x until reaching a relative position in which they butt against one another, as shown in FIGS. 3a and 3b, and thus block the rotation of the two wheels 33 and 34 with respect to one another. This prevents the threaded rod 18 from continuing to rotate in the first direction of rotation. The rod 18 is blocked in a first angular position on the axis x. The relative movement of the two ends 10 and 11 and the increase or decrease in the size of the loop formed by the strap 5 are then blocked. In summary, the proposed solution is to fit the screw-and-nut system 17 with two opposing periodic, solid, clean stops which will come into contact after a certain angular travel (certain number of turns) of the threaded rod on the axis x in one direction of rotation. This solution has the advantage of preventing the movement-transforming mechanism, and hence the strap, from becoming stuck. Specifically, with stops of this type, after the rotation of the threaded rod has been blocked in the first direction of rotation, it is possible to turn it in the other direction without any resistance. This purely mechanical solution is therefore reliable and fully reversible.

If both wheels 33 and 34 have the same number of teeth, the two stops will butt against one another substantially on completion of one turn of a wheel 33 or 34. The angular travel of the threaded rod is then limited to one turn if the wheel 33 is rigidly connected to the threaded rod 18. This results in the amplitude of the variation in the diameter of the loop being limited. The strapping device will therefore be able to function for a limited range of diameters of objects or antennas 101.

Advantageously, the number of teeth of the wheel 33 is different from the number of teeth of the wheel 34. Thus, it is possible to configure the two stops 31, 32 so as to allow a travel of the threaded rod 18 corresponding to an angular travel of more than one turn of one of the wheels 33 or 34. The relative positions of the two stops 31, 32 will vary with each turn. It is then possible to increase the amplitude of the variation in the diameter of the loop.

Advantageously, the numbers of teeth of the wheels 33 and 34 together make a prime number. Their greatest common divisor PGDC is equal to 1. This configuration allows a significantly greater angular travel of the threaded rod 18. The variation in the distance between the two ends of the strap 10 and 11 and hence the variation in the diameter of the loop is then at a maximum.

Preferably, the wheel having the smallest number of teeth, here the first wheel 33, is the driven wheel. In other words, it is coupled to the threaded rod 18 such that they have one and the same angular travel on their respective axes of rotation. This makes it possible to obtain a maximum angular travel of the threaded rod 18.

In the embodiment of the figures, the wheel 33 and the rod have the same axis of rotation. As a variant, this wheel 33 has an axis of rotation that is different from that of the threaded rod. The wheel and the threaded rod are for example coupled by means of a transmission joint such as a Cardan joint or an Oldham joint. As a variant, the axis of rotation of the wheel 33 is different from the axis x and the toothing of the wheel 33 cooperates with the threading of the threaded rod 18, for example via another toothed wheel, so as to rotate it.

Advantageously, as shown in FIGS. 3a to 3c, the stop 31 and the stop 32 are configured (in terms of shape and dimensions) and arranged to butt against one another so as to limit an angular travel of the threaded rod 18 at a first extremal angular position, on the axis x, when the threaded rod turns in a first direction of rotation on its axis x. In the example of the figures, since the threaded rod is rigidly connected to the wheel 33, this direction of rotation is that of the wheel 33 represented by an arrow in FIG. 3b. The stops 31 and 32 then occupy a first relative position shown in FIG. 3b. The stops are also configured and arranged to butt against one another in a second relative position (shown in FIG. 3c) so as to limit the rotation of the threaded rod at a second extremal angular position when the threaded rod 18 turns in a second direction, opposite the first direction. This second direction of rotation is represented by the arrow showing the direction of rotation of the wheel 33 in FIG. 3c. In other words, in the non-limiting example of FIG. 3, the stops 31, 32 are arranged to block the strap 5 for an operational maximum size of the loop (minimum distance between the ends 10 and 11 obtained when the threaded rod occupies the first extremal angular position) and for an operational minimum size of the loop (maximum distance between the ends 10 and 11 obtained when the threaded rod occupies the second extremal angular position). Furthermore, they are configured and arranged so as to allow the threaded rod 18 to rotate from the second extremal angular position to the first extremal angular position in the first direction of rotation and from the first angular position to the second extremal angular position in the opposite direction.

The number of teeth of the wheel 33 is denoted by $Z_1$, and the number of teeth of the wheel 34 is denoted by $Z_2$, where $Z_1$ is different from $Z_2$.

PGCD is the greatest common divisor between $Z_1$ and $Z_2$,
$n_1$ is the number of turns of the wheel 33 between the first relative position between the stops (FIG. 3b) and the second relative position between the stops (FIG. 3c), i.e. between the first extremal angular position and the second extremal angular position in the second direction, and $n_2$ is the number of turns of the wheel 34 between the first relative position and the second relative position.

$$\text{Then: } n_1 = \frac{Z_2}{PGCD} - \frac{\alpha}{\pi} = n_2 * \frac{Z_2}{Z_1} \text{ and } n_2 = \frac{Z_1}{PGCD} - \frac{\beta}{\pi}.$$

where $\alpha$ is the angle formed, in the first relative position, between the straight line connecting the point of contact P, between the stop 31 and the stop 32, and the center C1 of the wheel 33 and the straight line connecting the centers C1 and C2 of the two wheels 33 and 34. $\beta$ is the angle formed between the straight line connecting the point of contact P between the stop 31 and the stop 32, in the first relative position, to the center C2 of the wheel 34 and the straight line connecting the centers C1 and C2 of the two wheels 33 and 34. In FIG. 3c, the point of contact P' between the two stops 31 and 32 is symmetric with the point P with respect to the straight line C1, C2.

The angular travel of the threaded rod 18 between its first extremal angular position and its second extremal angular position in the second direction of rotation is here the angular travel of the wheel 33. Consequently, the maximum number of turns of the rod 18 is $n_1$ which is close to the number of teeth of the drive wheel 34.

Throughout the rest of the text, the terms "first extremal angular position" and "second extremal angular position" are understood to mean the angular positions of the threaded rod in which it is blocked by the stops in the two respective directions. The values of these angular positions vary with the embodiments according to the configuration of the stops.

Figure 4A:
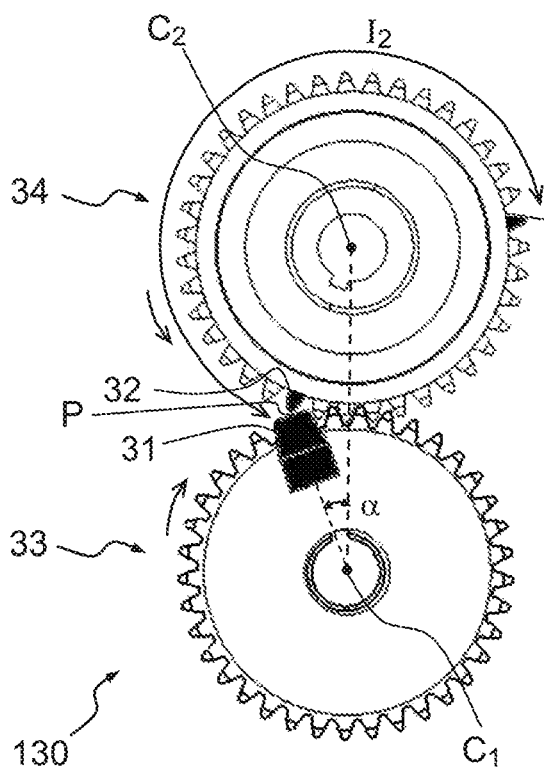
FIGS. 4a and 4b schematically show a front view of a gearset of a drive device according to a second embodiment in a configuration in which a first direction is blocked (FIG. 4a) and in a configuration in which a second, opposite direction is blocked (FIG. 4b)
Figure 4B:
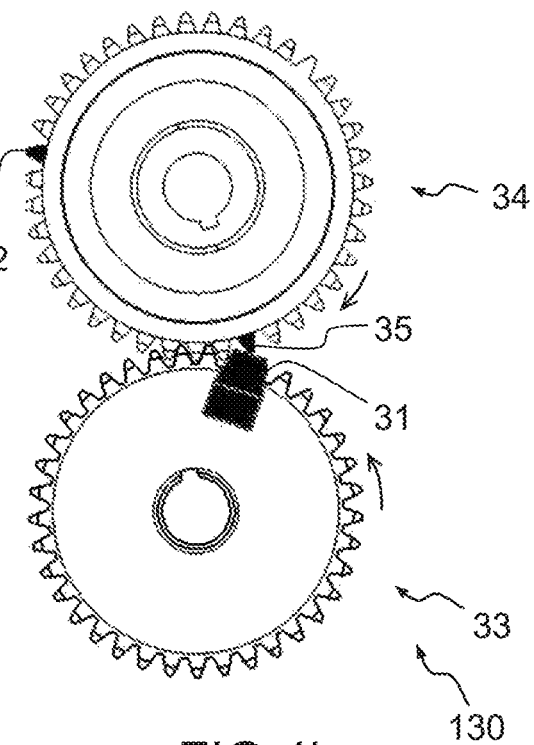

In one variant shown in FIGS. 4a and 4b, the gearset 130 comprises the two toothed wheels 33 and 34. It comprises the stops 31 and 32 and the third stop 35 which is connected in rotation to the wheel 34 about the axis of rotation of the wheel 34. Advantageously, the third stop 35 is arranged so as to butt against the first stop 31, when they occupy a relative position shown in FIG. 4b, in order to limit the angular travel of the threaded rod 18 at the second extremal angular position in the second direction, opposite the first direction. In other words, the stops are arranged such that when, starting from its second extremal angular position, turning in the first direction of rotation, the stop 31 first butts against the stop 32 (as shown in FIG. 4a) in order to limit the angular travel of the threaded rod 18 in the first direction. It is then in a first extremal angular position. The stops 31, 32, 35 are also arranged such that, starting from the first extremal angular position, the threaded rod 18 turning in the second direction of rotation, it butts against the stop 35, before encountering the stop 32. In other words, when starting from its first angular position, the threaded rod 18 turning in the second direction of rotation, it is blocked by the stop 35 and cannot reach the second stop 32. It is thus possible to decrease the angular travel of the threaded rod 18 and hence the variation in the distance between the ends 10 and 11 and the variation in the size of the loop.

$I_2$, smaller than $Z_2$, is the number of gaps between two adjacent teeth separating the stops 32 and 35 of the wheel 34, the number of gaps being counted from 32 to 35 in the direction of rotation of the wheel 34 when this wheel turns so as to move from the position with stop 32 against 31 to the position with stop 35 against 31.

When the wheel 33 comprises one stop and the wheel 34 comprises two stops, then the number $n_3$ of turns of the wheel 33 on its axis between the two extremal angular positions of the threaded rod is:

$$n_3 = \min\left\{\begin{array}{c} \frac{Z_2}{PGDC\{Z_1; Z_2\}}; \\ \min\left\{s \in N \mid \frac{I_2 + s*Z_2}{Z_2 - Z_1} \in N\right\} \end{array}\right\} - \frac{\alpha}{\pi}$$

When, starting from the first extremal angular position in which the stops 31 and 32 are butting against one another, the threaded rod 18 turns in the second direction and encounters the stop 35 before once again encountering the stop 32 and thus blocking the rotation of the rod 18 in the second direction, then:

$$n_3 = \min\left\{s \in N \mid \frac{I_2 + s*Z_2}{Z_2 - Z_1} \in N\right\} - \frac{\alpha}{\pi}$$

If the stop 31 is not blocked by the stop 35 before the stop 32 in the second direction, then:

$$n_3 = \frac{Z_2}{PGDC\{Z_1; Z_2\}} - \frac{\alpha}{\pi}$$

It is possible to adjust $I_2$ to obtain the desired n1.

Thus, with two toothed wheels with 37 and 39 teeth, one of the wheels including a single stop and the other two stops placed 26 teeth apart, approximately 13 turns of the threaded rod are allowed from one stop to the next since, on each turn, the relative position of the stops varies by two teeth.

To find $I_2$ as a function of $Z_1$, $Z_2$ and $n_1$:

$$I_2 = \min\left\{s \in N \mid \left(n_1 + \frac{\alpha}{\pi}\right)*(Z_2 - Z_1) - s*Z_2 \in N\right\}$$

As a variant, the stop 35 is connected to the toothed wheel 33 in rotation about the axis of rotation of the wheel 33. It is arranged to butt against the stop 32 so as to prevent the threaded rod 18 from rotating in the second direction when the threaded rod 18 occupies the second extremal angular position.

Figure 5A:
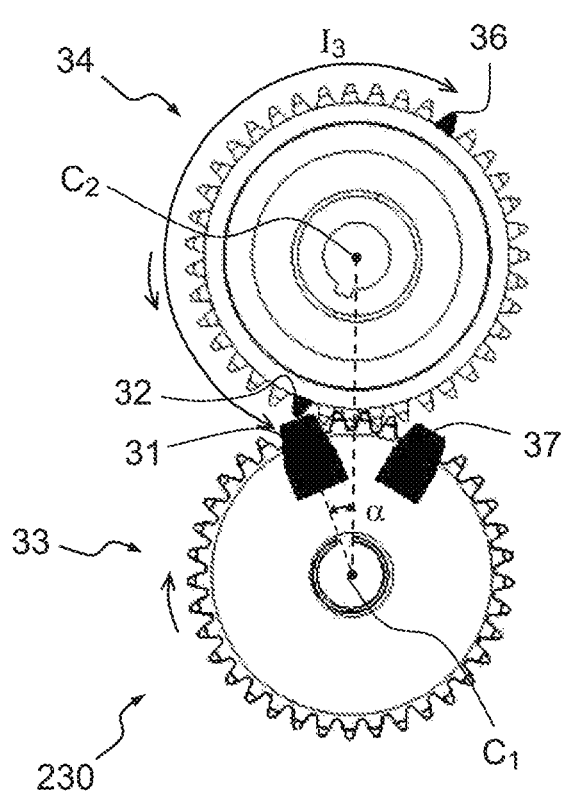
FIGS. 5a to 5b schematically show a front view of a gearset of a drive device according to a third embodiment in a configuration in which a first direction is blocked (FIG. 5a) and in a configuration in which a second, opposite direction is blocked (FIG. 5b)
Figure 5B:
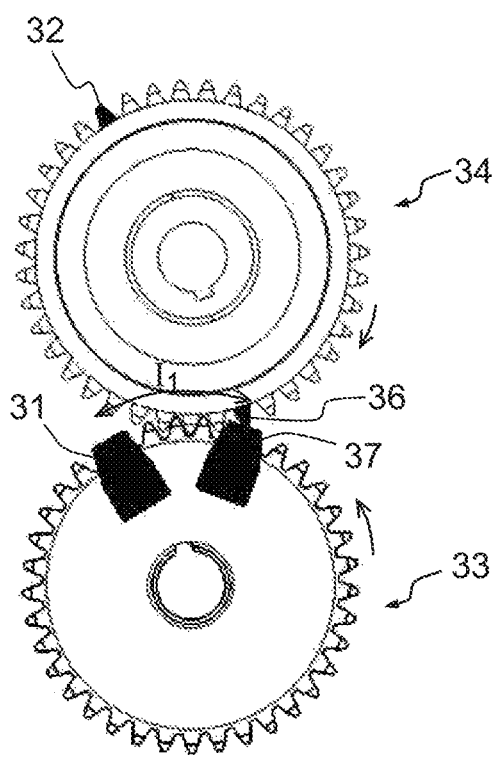

In one variant shown in FIGS. 5a and 5b, the gearset 230 comprises the two wheels 33 and 34. The stops 31 and 32 are advantageously configured and arranged to butt against one another when they occupy a first relative position shown in FIG. 5a so as to limit an angular travel of the threaded rod 18 to the first extremal angular position in the first direction of rotation of the threaded rod 18. The gearset 230 also comprises a first additional stop 36 connected to the wheel 34 rotating about the axis of rotation of the wheel 34 and a second additional stop 37 connected to the wheel 33 rotating about the axis of rotation of the wheel 33, the first additional stop 36 and the second additional stop 37 being configured and arranged to butt against one another so as to limit the angular travel of the threaded rod 18 at a second extremal angular position in the second direction. In other words, the threaded rod is blocked by two stops 31, 32 butting against one another in one direction and by two other stops 36, 37 butting against one another in the other direction. The stops are configured and arranged to allow the threaded rod to go from its first extremal angular position to its second extremal angular position in the first direction and in reverse, in the opposite direction. This solution allows the angular travel of the threaded rod 18 between the two blocking positions to be controlled with greater precision. In the solutions with two or three stops, it is possible to obtain numbers of turns of the wheel 33 at intervals of one turn with the angular offset of α/Π. The fourth stop allows the number of turns to be controlled with greater precision. The stops are positioned and configured with respect to one another according to the desired angular travel for the threaded rod, numbers of teeth of the two wheels and angles formed between the stops and the axis between the centers of wheels in their relative blocking positions.

$I_3$, smaller than $Z_2$, is the number of gaps between two adjacent teeth between the stops 32 and 36 of the wheel 34, the number of gaps being counted from 32 to 36 in the direction of rotation of the wheel 34 when this wheel turns so as to move from the position with stop 31 against 32 to the position with stop 36 against 37.

$I_1$, smaller than $Z_1$, is the number of gaps between two adjacent teeth between the stops 31 and 37 of the wheel 33, the number of gaps being counted from 31 to 37 in the direction of rotation of the wheel 34 when this wheel turns so as to move from the position with stop 31 against 32 to the position with stop 36 against 37.

The number $n_4$ of turns of the wheel 33 on its axis between the two extremal angular positions of the threaded rod when the two wheels each comprise two stops is then:

$$n_4 = \min \left\{ \begin{array}{l} A = \dfrac{Z_2}{PGCD\{Z_1; Z_2\}} \\ ; \\ B = \min\left\{ s \in N \left| \dfrac{I_3 + s*Z_2}{Z_2 - Z_1} \in N \right. \right\} \\ ; \\ C = \dfrac{I_1}{Z_1} + \min\left\{ s \in N \left| \dfrac{I_1 + (s-1)*Z_2}{Z_2 - Z_1} \in N \right. \right\} \\ ; \\ D = \dfrac{I_1}{Z_1} + \min\left\{ s \in N \left| \dfrac{I_1 + I_3 + (s-1)*Z_2}{Z_2 - Z_1} \in N \right. \right\} \end{array} \right\} - \dfrac{\alpha}{\pi}$$

$n_4$=A when it is the stops 31 and 32 butting against one another that blocks the rotational movement of the rod in both directions. $n_4$=B when it is the stops 31 and 32 butting against one another that blocks the rotation of the threaded rod in the first direction and the stops 31 and 36 butting against one another that blocks the rotation of the rod in the other direction. $n_4$=C when it is the stops 31 and 32 butting against one another that blocks the rotation of the threaded rod in the first direction and the stops 32 and 37 butting against one another that blocks the rotation of the rod in the other direction. $n_4$=D when it is the stops 31 and 32 butting against one another that blocks the rotation of the threaded rod in the first direction and the stops 32 and 37 butting against one another that blocks the rotation of the rod in the other direction.

To configure the stops, it is first necessary to determine $I_1$ on the basis of the desired value $n_4$:

$$I_1 = Z_1 * \min\left\{ s \in N \left| n_4 - s \geq \dfrac{\alpha}{\pi} \right. \right\}$$

Then to configure $I_3$:

$$I_3 = \min\left\{ s \in N \left| \left(n_4 + \dfrac{\alpha}{\pi} - \dfrac{I_1}{Z_1}\right) * (Z_2 - Z_1) + (1-s)*Z_2 - I_1 \in N \right. \right\}$$

It is however not possible, for two given values $Z_1$ and $Z_2$, to configure all values of $n_4$ $$\in \left\{ s \in \dfrac{N}{Z_1} \left| s - \dfrac{\alpha}{n} \right. \right\}$$

since there may be an encounter between 36 and 31 or 32 and 37 before stop 36 encounters stop 37. It is therefore necessary to verify it using the formula given above $n_4$=min (A, B, C, D).

In the embodiments of the figures, the stops are lugs superposed onto the toothing of one of the wheels. The toothing of the first wheel 33 bears the reference 38 and the toothing of the second wheel 34 bears the reference 39 only in FIG. 3a.

In the embodiment of the figures, the second stop 32 is superposed onto one of the teeth of the second wheel 34 and has a cross section of the same shape and same size as a tooth of the wheel 34 in a plane perpendicular to the axis of rotation of the wheel 34.

The first stop 31 has a contact surface S, forming, in a plane perpendicular to the axis x of the first wheel, substantially the shape of a portion of a circle that is substantially superposed onto the circle of larger diameter delimiting the teeth of the toothed wheel and having an angular opening that is substantially equal to the opening from one tooth to another, adjacent tooth of the wheel 33 about the axis of rotation of the wheel 33. The two stops 31 and 32 extend to one and the same position along the longitudinal axis of the threaded rod 18. Thus, the radial end of the second stop 32 comes into contact with the contact surface S of the first stop when they are facing one another. This cooperation through shape allows, in the case of FIG. 3a, contact at one and the same location on each of the two stops in both directions due to the symmetry of the two stops with respect to radial planes each comprising the axis of rotation of the corresponding wheel. The stop 31 forms, with the axis C1-C2, an angle $\alpha$ and the stop 32 forms, with the axis C1-C2, an angle $\beta$ when they are in the second relative position.

As a variant, at least one of the stops is asymmetric with respect to a radial plane comprising the axis of rotation of the wheel. In this case, the stops 31 and 32 form angles that are different from $\alpha$ and $\beta$, respectively, when they are in the second relative position.

The stops are positioned such that the angles $\alpha$ and $\beta$ of the point of contact between the two stops are non-zero so as to ensure that the stops block the rotation.

It is possible to widen at least one of the stops so as to increase the area of contact between the stops and the pressure. The angular travel is then decreased.

Advantageously, the maximum radial distance from each stop to the axis of rotation of the wheel to which it is rigidly connected is substantially equal to the radius of the tip circle of the toothed wheel. In general, the sum of the maximum radial distances relative to two stops that are intended to cooperate so as to provide blocking in one direction is greater than or equal to the interaxial distance between the two wheels, as otherwise there would be no contact.

Each stop is connected to a wheel in rotation about the axis of rotation of the wheel. The stop is advantageously rigidly connected to the wheel in rotation about the axis of rotation of the wheel.

Advantageously, each stop is rigidly connected to the corresponding wheel. In other words, it is fixed with respect to the corresponding wheel.

The stops may be produced as one piece with the toothed wheels or else attached to the toothed wheels.

In one embodiment, the stops are able to occupy a single defined angular position with respect to the corresponding wheel about its axis of rotation. They are then, for example, attached to the corresponding respective wheels by interlocking, or produced as one piece with the corresponding respective wheels or are permanently attached thereto. Thus, the angular travel of the threaded rod 18 or its extremal angular positions are adjusted by construction when installing the two wheels 33 and 34 on the frame 19 by choosing the angular positions of the two wheels 33 and 34 according to the positions of the stops on the toothed wheels.

As a variant, at least one stop of the set of stops is able to occupy a plurality of predetermined set angular positions, with respect to the corresponding wheel 33 or 34 about the axis of rotation of the wheel. In other words, the set position of the stop in question with respect to the wheel in question is adjustable. It is possible to adjust it by adjusting the position of one or more stops, after mounting the toothed wheels. The angular travel of the rods may then be adjusted as needed in terms of amplitude of the variation in the size of the loop and/or in the operational maximum size and/or in the operational minimum size that are desired, once after mounting the wheels on the frame. The stop may be mounted on the corresponding wheel by means of an indexing device allowing its angular position to be adjusted with respect to the wheel about the axis of rotation of the wheel. The mechanical connection allowing the indexing may be made, without preference by pegging, by screwing, by keying or by any other means.

Advantageously, at least one of the stops is attached removably to the corresponding wheel and is able to occupy a plurality of predetermined set angular positions, with respect to the corresponding wheel about the axis of rotation of the wheel. The amplitude of the variation in the size of the loop and in the operational minimum size and in the operational maximum size of the loop are adjustable after mounting the wheels, by positioning the removable stop on the wheel in question.

Figure 6:
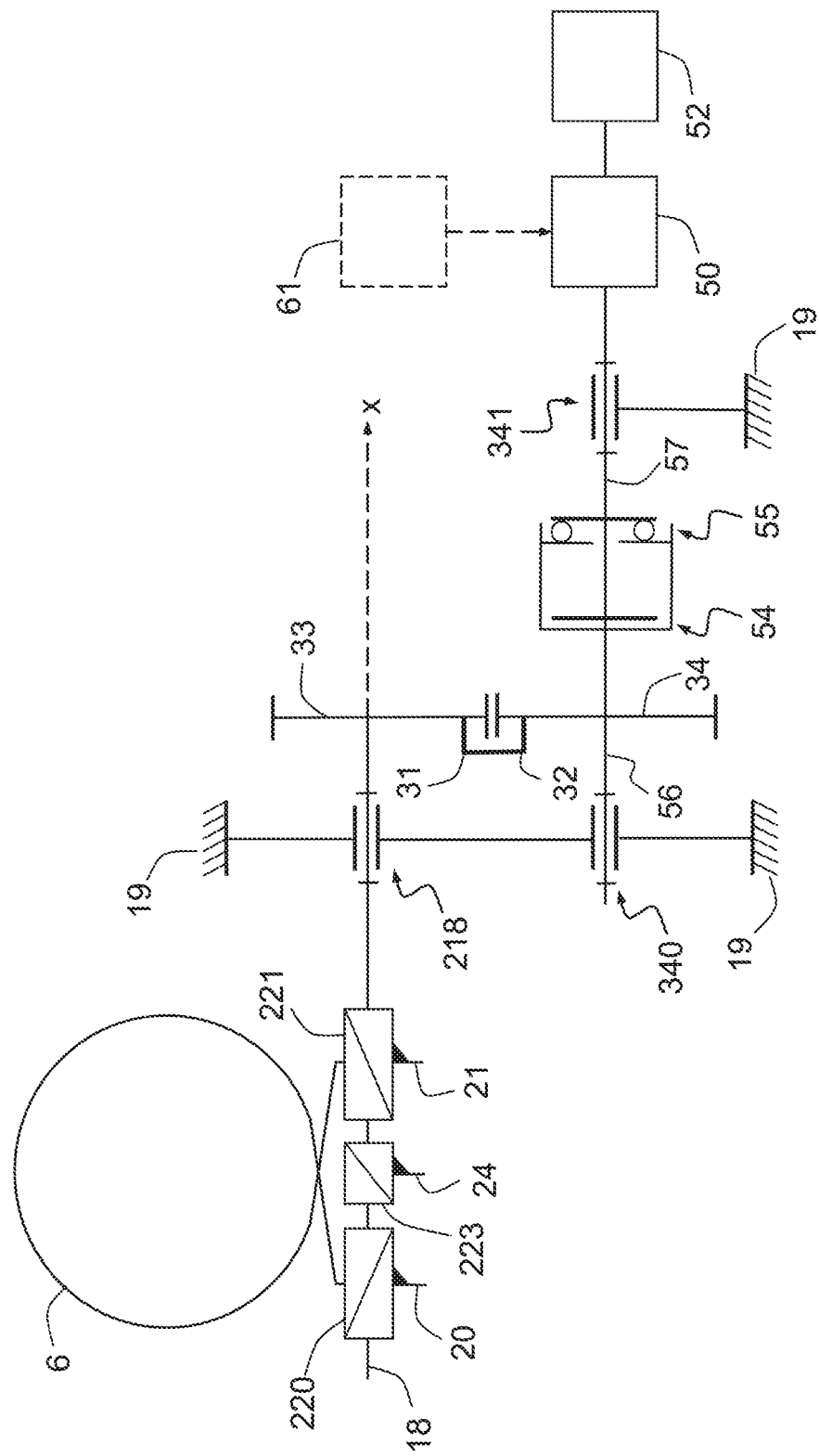
FIG. 6 is a simplified kinematic diagram of the drive device according to the invention.

Advantageously, the drive device 15 comprises, as visible in FIG. 6, a motor 50 that drives the threaded rod 18 so that it rotates on the axis x. The motor 50 drives the wheel 34 in rotation on its axis. The gearset 30 transmits this movement to the threaded rod via the wheel 33. The motor 50 is, for example, coupled to the wheel 34 by means of reduction gearing (not shown).

The drive device 15 also comprises a grip 52 coupled to the second wheel 34. The grip 52 allows an operator to turn the second wheel 34 on its axis p. In this case, when manually actuating the grip, the torque imparted by the operator is transmitted to the threaded rod via the toothed wheels 34, 33, and the reduction gearing 51 and the motor 50 are inactive. As a variant, the grip 52 is connected in rotation to the first wheel 33.

Advantageously, the device 15 comprises a torque limiter 54 configured and arranged in such a way as to eliminate the transmission of torque between the motor 50 and the threaded rod 18 when the torque on the axis of the threaded rod exceeds a predetermined threshold.

Advantageously, the device 15 comprises a torque limiter 54 and a freewheel 55 that are configured and arranged in such a way as to make it possible to limit a torque rotating the threaded rod 18 on the axis x in one direction of rotation only in which the freewheel 55 allows rotation and therefore slippage in the torque limiter. In the other direction, the freewheel does not permit any rotation and the torque limiter is unable to act. Advantageously. this direction of rotation is the direction corresponding to clamping, namely the direction of rotation that causes the two ends 10 and 11 to move further apart from one another. This device makes it possible to prevent the clamping torque from exceeding a predetermined threshold which is the same regardless of the diameter of the antenna. Conversely, the torque limiter does not come into action in the unclamping direction. The system of stops according to the invention is perfectly compatible with the torque limiter.

FIG. 6 is a simplified kinematic diagram of the drive device. The screw connections 220 and 221 between the nuts 20 and 21, respectively, and the threaded rod are shown. The pivot connections 218 and 340 between the frame 19 and threaded rod 18 and the wheel 34, respectively, are also shown. The connections that prevent the nuts from rotating with respect to the frame are not shown.

The motor is coupled to the second wheel 34 by means of the torque limiter 54 and by means of the freewheel 55, if present. The freewheel 55 allows the coupling/uncoupling of two shafts 56, 57 that are connected to the frame 19 by pivot connections 340, 341. A first shaft 56 is rigidly connected to the wheel 34 and the other 57 is a shaft of the motor 50. The stops 31, 32 and the motor 50 are connected by the torque limiter 54 and the freewheel 55. This makes it possible to avoid a maladjustment in the position of the stops with respect to the position of the strap which is obtained in one variant in which the first toothed wheel 33 is coupled to the threaded rod 18 via the torque limiter 54 and the freewheel 55.

Advantageously, the stops are configured and arranged so as to prevent the relative rotation of the two toothed wheels when the motor is rotating at maximum speed without the stops being damaged. In other words, the stops are configured and arranged so as to withstand, without damage, a sudden stop at maximum motor speed.

Advantageously, the stops are configured so as to prevent the relative rotation of the two toothed wheels for a predetermined maximum torque applied to the axis x of the threaded rod 18 without the stops being damaged. This torque is advantageously higher than the maximum torque applied by a strong operator turning the grip by force.

In the embodiment in the figures, the clamping strip 6 forms a closed loop. In other words, the clamping strip comprises two strip strands 7 and 8 referenced in FIG. 2, each comprising one end 10 and 11 of the clamping strip 6 and intersecting one another in such a way that a closed loop intended to completely encircle the object that is to be clamped, namely making a complete turn around the object, is formed by the clamping strip 6. The use of a strip 6 forming a closed loop by the intersection of two strip strands makes it possible to vary the size of the loop significantly and thus to grip and release objects of different diameters. The two ends 10 and 11 move apart from one another, along with the nuts, along the axis x during clamping and come closer to one another, along with the nuts, along the axis x during unclamping. As a variant, the loop is open.

Advantageously, as shown in FIG. 6, the drive device 15 comprises a control member 61. It also comprises one or more position sensors 70, 80, visible in FIG. 2, which are configured to detect a limit minimum size of the loop, which is greater than the operational minimum size of the loop in the clamping direction, and/or a limit maximum size of the loop, which is smaller than the operational maximum size of the loop in the unclamping direction. In other words, more generally, it comprises at least one sensor making it possible to detect a first limit angular position of the threaded rod in the first direction preceding the first extremal angular position in the first direction of rotation and/or at least one sensor (which may be the same as or different from the sensor) making it possible to detect a second limit angular position of the threaded rod in the second direction preceding the second extremal angular position in the second direction of rotation. The control member 61 receives information from the one or more sensors and is advantageously configured to stop the motor 50 when the limit minimum size in the clamping direction is reached (here when the threaded rod rotates in the first direction and reaches the first limit angular position) and to stop the motor when the limit maximum size in the unclamping direction is reached (here when the threaded rod rotates in the second direction and reaches the second limit angular position), preferably before the operational minimum size (corresponding to the first extremal angular position defined by the stops) or the operational maximum size (corresponding to the second extremal angular position defined by the stops) is reached.

The position sensors 70, 80 are advantageously sensitive to a variation in the relative distance between the two ends 10 and 11 along the axis x. In the non-limiting example of FIG. 2, the sensors each comprise a push-button switch 71 and 81, respectively, these being attached to the nuts 20 and 21, respectively, and an actuator 72, which is here common to both sensors and produced in the form of a stop. The stop 72 is arranged between the two nuts 20 and 21, and is attached to a nut 24 by screw connection, by means of a screw connection 223 shown in FIG. 6, with the rod 18, which is fixed in terms of rotation on the axis x with respect to the frame 19 that is engaged with a third screw thread 73 formed in the same direction as the screw thread 23 having a pitch that is longer than the pitch of the screw thread 23. The sensor 70 is configured and arranged to switch from a closed to an open configuration, or vice versa, when the end 10 occupies, along the axis x, a position corresponding to the limit maximum size of the loop, and the sensor 80 is configured and arranged to switch from a closed to an open configuration, or vice versa, when the end 11 occupies, along the axis x, a position corresponding to the limit minimum size of the loop. As a variant, the arrangement of the two parts of the sensor is different. The sensors may comprise an actuator, each of which is arranged outside of the space between the two nuts along the axis x and each of which engaged with a different screw thread. As a variant, at least one sensor is another type, for example an optical or magnetic sensor. As a variant, at least one sensor comprises a part that is attached to the frame and a sensor that is attached to one of the nuts.

The operations for clamping or unclamping an object by means of the strapping device may be performed in two ways: electrically using series of automatic sequences by means of the control device and manually by virtue of the hand grip when the control device and/or the motor are not powered (generally in the case of maintenance). In the cases of electrical automatic operations, the travels are controlled by means of the set of sensors (contactors). In the case of manual operations using the grip, the contactors are of no use in stopping the movement. The problem of having to limit the forces or to stop the travel of the screw-and-nut system is then encountered. In the case of clamping, when there is no object within the strap, or when it is not fully in position, clamping cannot take place. The clamping operation should then be stopped before the drive device (in particular the contactors) suffers damage. In the case of unclamping, it is a matter of limiting the widening of the strap so that it does not butt against the bottom of its housing formed within the frame such that reclamping of the strap continues to remain possible. Specifically, since the torque limiter acts only in the clamping direction, reclamping could prove to be impossible for an operator who is not so strong or a motor that is not able to impart sufficient torque. The proposed solution allows limited widening and/or reclamping of the strap, which prevents any damage to the strap and avoids the strap getting stuck at all, whether in the event of manual operation or in the event of a fault in the control member of a sensor or the motor.

The control member may comprise one or more dedicated electronic circuits or a general-purpose circuit. Each electronic circuit may comprise a reprogrammable computing machine (a processor or a microcontroller for example) and/or a computer executing a program comprising a sequence of instructions and/or a dedicated computing machine (for example a set of logic gates such as an FPGA, a DSP or an ASIC, or any other hardware module).

As an alternative, the clamping strip 6 does not form a closed loop, but rather an open loop. In that case, its ends move closer together during clamping and further apart during unclamping.

The clamping strip 6 comprises for example a metal ribbon or a strip of plastic material. The perimeter or size of the loop varies, for example, during clamping, by varying the bending of the clamping strip. The strip advantageously takes a shape at rest that is such that the central part substantially follows the shape of the perimeter of the object that is to be gripped.

The strap also comprises shoes 14, distributed along the clamping strip in such a way as to be intended to be interposed between the clamping strip 6 and the object that is to be gripped. A shoe (not shown) may be provided facing the zone in which the strip strands 7 and 8 intersect.

Figure 7:
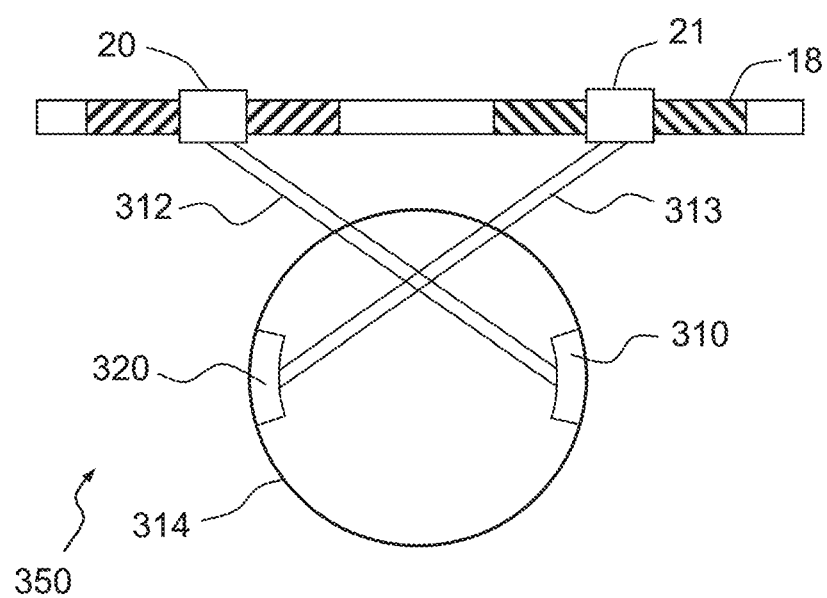
FIG. 7 shows a partial view of a holding device according to the invention.

The drive device according to the invention may be incorporated into another type of holding device 350 as shown in FIG. 7 of the type comprising two pads 310 and 320 which are attached in terms of translation on the axis x to the nut 20 and to the nut 21 via bars 312 and 313, respectively, which intersect. For greater clarity, only the threaded rod (without the third screw thread), the nuts, the pads and the bars 312, 313 have been shown, but the drive device is a drive device according to the invention. When the rod 18 rotates in one direction, the nuts 20 and 21 move closer together and the pads 310, 320 move further apart so as to come to bear against a hollow body 314, for example of cylindrical cross section, on the inside of the hollow body so as to apply force in opposite directions parallel to the axis x, for example opposing forces, to the hollow body in order to grip the body. These forces are advantageously radial, along one and the same radial axis defined for a circular cross section of a hollow body. When the rod rotates in the opposite direction, the nuts move apart and the pads move closer together so as to move away from the hollow body and release same. As an alternative, the direction in which the pads move is that of the nuts. For example, the bars 312 and 313 do not intersect. Advantageously, the torque limiter 54 and the freewheel 55, if present, are arranged in such a way as to make it possible to limit a torque rotating the threaded rod 18 on the axis x in one direction of rotation, and possibly in this direction only. This direction of rotation is the direction corresponding to clamping, namely the direction of rotation that causes the two pads to move further apart and therefore causes the two nuts to move closer together.

The invention claimed is:

1. A drive device comprising:
   a screw-and-nut system comprising a threaded rod and a first nut that is connected to the threaded rod by means of a screw connection;
   a gearset, allowing a rotational movement to be transmitted to the threaded rod, a first toothed wheel and a second toothed wheel engaged with the first toothed wheel;
   a set of stops comprising a first stop connected to the first wheel rotating about an axis of rotation of the first wheel and a second stop connected to the second toothed wheel rotating about an axis of rotation of the second wheel, the first stop and the second stop being configured and arranged to butt against one another so as to limit an angular travel of the threaded rod at a first angular position in a first direction.

2. The drive device as claimed in claim 1, wherein the first stop and the second stop are configured and arranged to butt against one another so as to limit the angular travel of the threaded rod at a second angular position in a second direction, opposite the first direction.

3. The drive device as claimed in claim 1, wherein the set of stops comprises a third stop connected to the first wheel rotating about the axis of rotation of the first wheel or connected to the second toothed wheel rotating about the axis of rotation of the second wheel and configured and arranged to butt against the second stop, or respectively against the first stop, so as to limit the angular travel of the threaded rod at a second angular position in a second direction, opposite the first direction.

4. The drive device as claimed in claim 1, wherein the set of stops comprises a first additional stop connected to the second toothed wheel rotating about the axis of rotation of the second wheel and a second additional stop connected to the first wheel rotating about the axis of rotation of the first wheel, the first additional stop and the second additional stop being configured and arranged to butt against one another so as to limit an angular travel of the threaded rod at a second angular position in the second direction, opposite the first direction.

5. The drive device as claimed in claim 1, wherein the first toothed wheel has a first number of teeth and the second toothed wheel has a second number of teeth, different from the first number of teeth.

6. The drive device as claimed in claim 5, wherein the first number of teeth and the second number of teeth together make a prime number.

7. The drive device as claimed in claim 1, wherein at least one stop of the set of stops is able to occupy a plurality of predetermined set angular positions, with respect to the wheel to which it is rotationally connected, about the axis of rotation of the wheel.

8. The drive device as claimed in claim 7, wherein at least one stop is mounted removably on the first wheel or on the second wheel at one angular position taken from a plurality of angular positions.

9. The drive device as claimed in claim 1, comprising a motor that is coupled to the threaded rod and drives the threaded rod so that it rotates on the longitudinal axis.

10. The drive device as claimed in claim 9, wherein the threaded rod is coupled to the motor via a torque limiter.

11. The drive device as claimed in claim 9, wherein the threaded rod is coupled to the motor via a torque limiter and a freewheel which are configured to limit a turning torque of the threaded rod on its longitudinal axis to one direction of rotation only.

12. The drive device as claimed in claim 9, comprising a control member and at least one sensor for detecting a first operational maximum angular position of the threaded rod in the first direction preceding the first angular position in the first direction, the control member receiving measurements from the first position sensor and being configured to control the motor on the basis of the measurements from the sensor so as to stop the motor when the first limit angular position is reached.

13. The drive device as claimed in claim 1, comprising a grip that is rigidly connected to one toothed wheel of the gearset allowing an operator to turn said toothed wheel on an axis of rotation of said toothed wheel.

14. A strapping device for binding an object comprising a clamping strip comprising a first end and a second end and forming a loop that is intended to surround the object, the strapping device comprising a drive device as claimed in claim 1, the drive device allowing the two ends to move with respect to one another so as to increase or decrease the size of the loop, the first end of the strap being rigidly connected to the first nut in translation along the axis of the threaded rod.

15. The strapping device as claimed in claim 14, wherein the first nut is engaged with a first screw thread of the threaded rod, the screw-and-nut system comprising a second nut engaged with a second screw thread of the threaded rod which is formed in the opposite direction to the first thread, the second end of the clamping strip being rigidly connected to the second nut in translation along the axis of the threaded rod.

16. A holding device for gripping a hollow object, said device comprising a first pad and a second pad which are capable of pressing against a hollow object, on the interior of the object, the holding device comprising a drive device as claimed in claim 1, configured to move the two pads in relation to one another so as to move them away from one another in order to grip the object or to move them closer together in order to release the object, the first pad being rigidly connected to the first nut in translation along the axis of the threaded rod, the screw-and-nut system comprising a second nut engaged with a second screw thread which is formed in the opposite direction to the first thread, the second pad being rigidly connected to the second nut in translation along the axis of the threaded rod.

* * * * *